US 11,644,844 B2

United States Patent
Nguyen et al.

(10) Patent No.: US 11,644,844 B2
(45) Date of Patent: May 9, 2023

(54) MOBILE ROBOT

(71) Applicant: Panasonic Intellectual Property Management Co., Ltd., Osaka (JP)

(72) Inventors: Duyhinh Nguyen, Chiba (JP); Takeshi Ando, Tokyo (JP); Hiroyuki Uematsu, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1010 days.

(21) Appl. No.: 16/430,377

(22) Filed: Jun. 3, 2019

(65) Prior Publication Data
US 2019/0384311 A1 Dec. 19, 2019

(30) Foreign Application Priority Data

Jun. 19, 2018 (JP) .............................. JP2018-116279
Mar. 1, 2019 (JP) .............................. JP2019-037608

(51) Int. Cl.
*G05D 1/02* (2020.01)
*G01S 17/06* (2006.01)
*G01S 7/481* (2006.01)

(52) U.S. Cl.
CPC ............ *G05D 1/0244* (2013.01); *G01S 7/481* (2013.01); *G01S 17/06* (2013.01)

(58) Field of Classification Search
CPC ......... G05D 1/0244; G05D 2201/0216; G05D 1/0293; G05D 1/0282; G05D 1/0236;
(Continued)

(56) References Cited

U.S. PATENT DOCUMENTS 6,397,149 B1 5/2002 Hashimoto
2014/0324270 A1 10/2014 Chan et al.
(Continued)

FOREIGN PATENT DOCUMENTS

EP 1884803 2/2008
JP 3-273419 12/1991
(Continued)

OTHER PUBLICATIONS

Communication pursuant to Article 94(3) EPC dated Mar. 18, 2021 in related European Patent Application No. 19171669.5.
(Continued)

*Primary Examiner* — Tony Ko
(74) *Attorney, Agent, or Firm* — Wenderoth, Lind & Ponack, L.L.P.

(57) ABSTRACT

A mobile robot includes at least two first reflection parts, each of the at least two first reflection parts having a first reflection surface on a side surface thereof, the first reflection surface being configured to reflect electromagnetic waves. For each of the at least two first reflection parts: a cross-sectional shape obtained by being cut in a first direction perpendicular to a reference axis is symmetrical and continuous with respect to points passing through the reference axis, the first direction being parallel to a top surface of the first reflection part or a bottom surface of the first reflection part; and a reflection surface angle defined by the points passing through the reference axis and both ends of the first reflection surface is 90 degrees or more to 360 degrees or less when the first reflection part is viewed along the reference axis.

17 Claims, 12 Drawing Sheets

(58) Field of Classification Search
CPC .... G05D 1/024; G05D 1/0242; G05D 1/0253; G05D 1/0259; G05D 1/0276; G01S 7/481; G01S 17/06
See application file for complete search history.

(56) References Cited

U.S. PATENT DOCUMENTS

| | | | |
|---|---|---|---|
| 2017/0123428 A1* | 5/2017 | Levinson | G05D 1/0257 |
| 2017/0153641 A1 | 6/2017 | Serizawa et al. | |
| 2017/0184705 A1 | 6/2017 | Fujii et al. | |
| 2019/0384311 A1* | 12/2019 | Nguyen | G01S 17/06 |

FOREIGN PATENT DOCUMENTS

| | | |
|---|---|---|
| JP | 8-50254 | 2/1996 |
| JP | 8-150582 | 6/1996 |
| JP | 2000-322696 | 11/2000 |
| JP | 2001-75645 | 3/2001 |
| JP | 2008-281427 | 11/2008 |
| JP | 2011-150443 | 8/2011 |
| JP | 3187472 U | 11/2013 |
| JP | 2017-107563 | 6/2017 |
| WO | 2015/122095 | 8/2015 |
| WO | 2016/057140 | 4/2016 |

OTHER PUBLICATIONS

Extended European Search Report dated Nov. 11, 2019 in related European Patent Application No. 19171669.5.

* cited by examiner

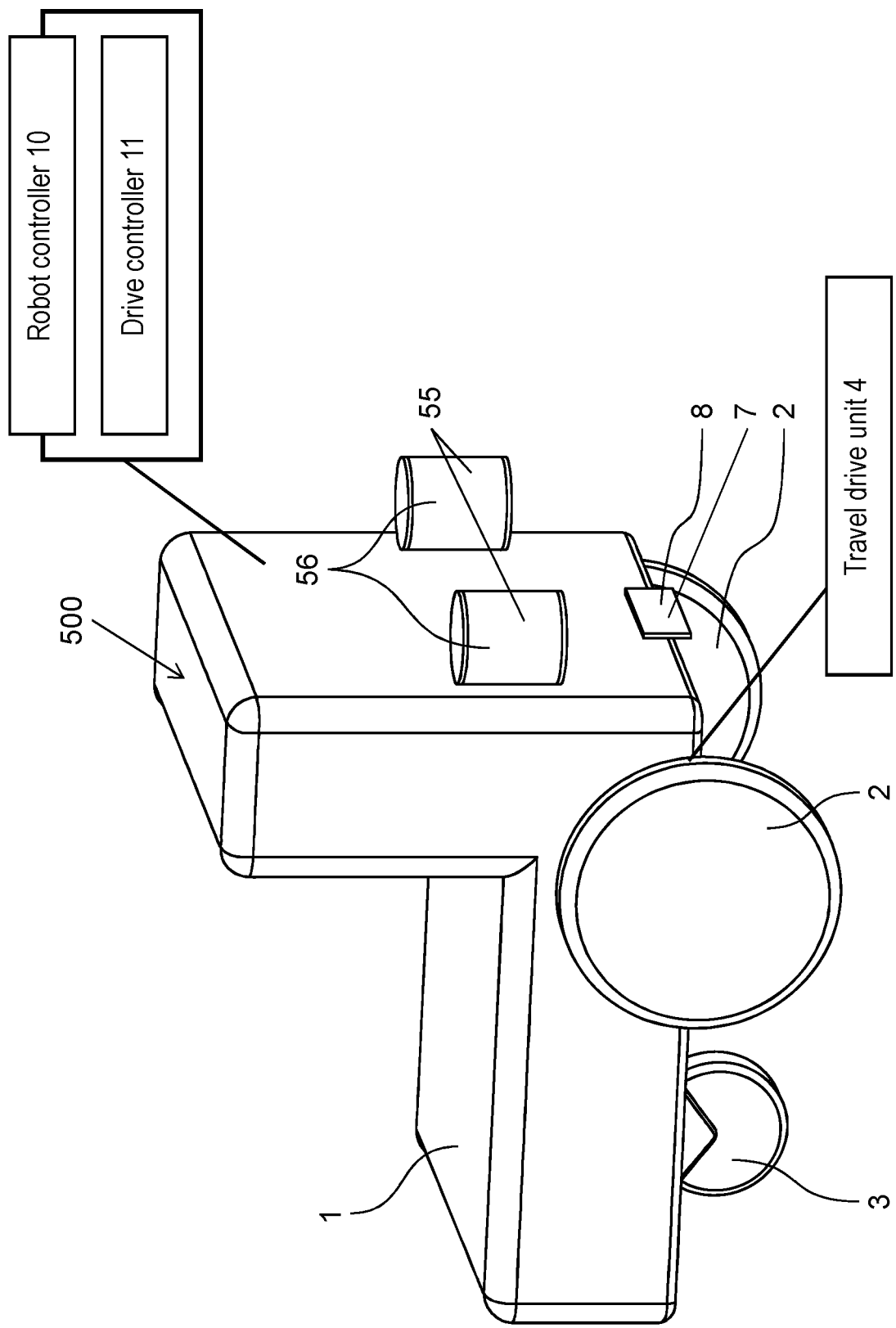

MOBILE ROBOT

TECHNICAL FIELD

The technical field relates to a mobile robot.

BACKGROUND

As a technique for position recognition of a mobile robot, there is a method of recognizing a position of the mobile robot by detecting reflected light reflected by a reflection part installed in the mobile robot (for example, JP-A-H8-150582 (Patent Literature 1)).

Patent Literature 1 says that laser light is emitted from optical devices and reflection intensities of reflected light reflected by a reflection target provided in the mobile robot are compared to thereby specify light reflected by the reflection target and recognize the position of the mobile robot.

However, in the above method, in a case where there is an object with a high reflection intensity or an object with a reflection intensity close to that of the reflection target within an environment where the mobile robot exists, it is difficult to discriminate them from the reflection target. Therefore, accuracy in position recognition of the mobile robot is low. Furthermore, even when the position of the mobile robot can be recognized, an orientation of the robot is not capable of being specified. Accordingly, it is difficult to obtain beneficial information for controlling the mobile robot such as analysis of a motion and prediction of a moving destination of the mobile robot.

SUMMARY

In view of the above, an object of the present disclosure is to provide a mobile robot capable of recognizing a position and an orientation with high accuracy.

In order to achieve the above object, a mobile robot according to one aspect of the present disclosure includes at least two first reflection parts having first reflection surfaces reflecting electromagnetic waves, in which the first reflection parts have a rotating body shape, having the first reflection surfaces on side surfaces, and an angle made by points passing through a rotation axis and both ends of the first reflection surface is 90 degrees or more to 360 degrees or less when the first reflection part is seen from a rotation axis direction.

BRIEF DESCRIPTION OF THE DRAWINGS

FIG. 10 is a schematic view of a mobile robot according to Embodiment 2;

DESCRIPTION OF EMBODIMENTS

Hereinafter, an embodiment of the present disclosure will be explained with reference to the drawings. The same numerals are added to the same components. Respective components are mainly shown in a schematic manner for making the drawings easy to understand.

Embodiment 1

Figure 1:
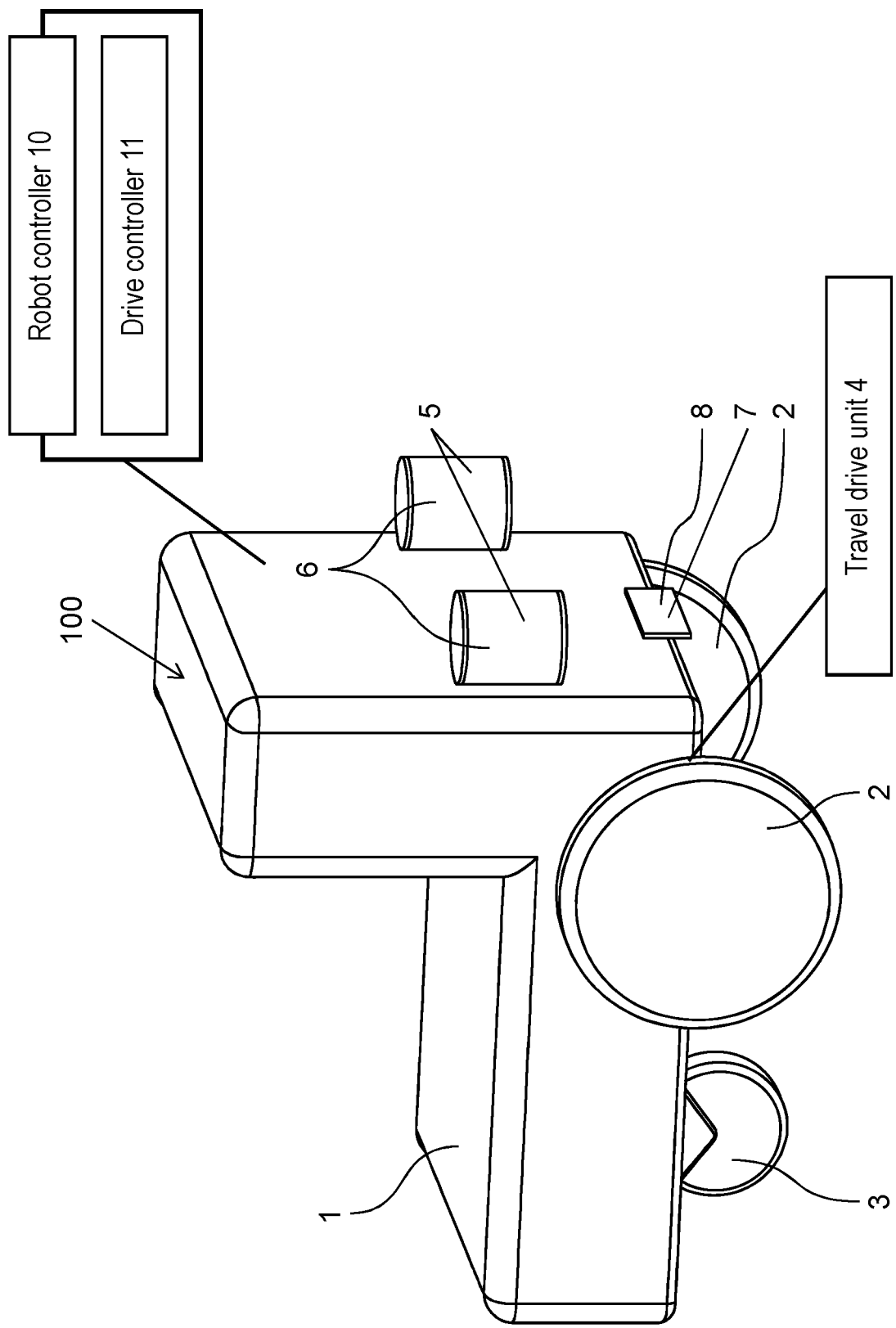
FIG. 1 is a schematic view of a mobile robot according to Embodiment 1.

First, a mobile robot according to Embodiment 1 will be explained with reference to the drawings. FIG. 1 is a schematic view of a mobile robot 100 according to Embodiment 1. The mobile robot 100 has at least a main body 1, drive wheels 2, driven wheels 3, a travel drive unit 4, a robot controller 10 including a drive controller 11 and first reflection parts 5 having first reflection surfaces 6.

<Structure of Mobile Robot 100>

The travel drive unit 4 is formed by a drive device such as a motor, which enables forward/reverse rotation of a pair of drive wheels 2 independently. The pair of drive wheels 2, a pair of driven wheels 3 and the travel drive unit 4 constitute a travel drive device.

The robot controller 10 controls the travel drive unit 4 through the drive controller 11.

The first reflection parts 5 have a rotating body shape, and at least two reflection parts are provided in the mobile robot 100.

Each first reflection part 5 has a first reflection surface 6 reflecting electromagnetic waves on a side surface. Here, a side surface indicates a surface formed by generating lines.

The first reflection part 5 has preferably a shape with straight generating lines such as a conical shape, a truncated-conical shape in addition to a cylindrical shape as shown in FIG. 1. That is because it is considered that the accuracy is deteriorated in a later-described recognition process as the shape of the first reflection part 5 becomes complicated such as cases where the generating lines include a curved line or a line inclination of which changes many times.

The first reflection part 5 may be a member to be attached to the main body 1 and may double as components forming the mobile robot 100 such as an arm or a support.

The first reflection part 5 may have a surface reflecting electromagnetic waves on a surface other than the side surface, for example, a bottom surface.

A rotation axis of the first reflection part 5 is preferably perpendicular to a traveling direction of the mobile robot 100.

The first reflection surface 6 is arranged in the first reflection part 5 so that an angle made by points passing through the rotation axis and both ends of the first reflection surface 6 (hereinafter referred to as a reflection surface angle) when the first reflection part 5 is seen from a rotation axis direction is 90 degrees or more to 360 degrees or less.

The first reflection surface 6 is preferably arranged in the first reflection part 5 so that the reflection surface angle is 180 degrees or more to 360 degrees or less.

More preferably, the reflection surface angle of the first reflection surface 6 is 270 degrees or more to 360 degrees or less. It is because recognition can be made with high accuracy without affecting the cross-sectional shape of the first reflection part 5 in the later-described recognition process even when the orientation of the mobile robot 100 changes to some degree.

Furthermore preferably, the first reflection surface 6 is arranged over the entire side surface of the first reflection part 5. That is, the reflection surface angle is preferably 360 degrees. That is because the recognition can be made with high accuracy without affecting the cross-sectional shape of the first reflection part 5 in the later-described recognition process even when the orientation of the mobile robot 100 changes.

The first reflection surface 6 may be formed by adhering a sheet or a stick label reflecting electromagnetic waves to the member or the component as the first reflection part 5. It is also preferable that the first reflection surface 6 is configured by forming the first reflection part 5 by a material reflecting electromagnetic waves.

The two first reflection parts 5 are arranged so that respective rotation axes are parallel to each other.

It is further preferable that the two first reflection parts 5 have the first reflection surfaces 6 so that respective reflection surface angles overlap by 180 degrees or more when overlapping with each other and seen from the rotation axis direction as well as the same direction. That is, both two first reflection surfaces 6 preferably face the same direction as shown in FIG. 1.

When a surface passing through the rotation axes of the two first reflection parts 5 is a reference surface, it is preferable that the two first reflection parts 5 have the first reflection surfaces 6 on the entire surfaces of at least one-side surfaces of respective side surfaces divided by the reference surface. That is, both two first reflection surfaces 6 face a one-side direction divided by the reference surface.

<Recognition Method Using Sensor>

Figure 2:
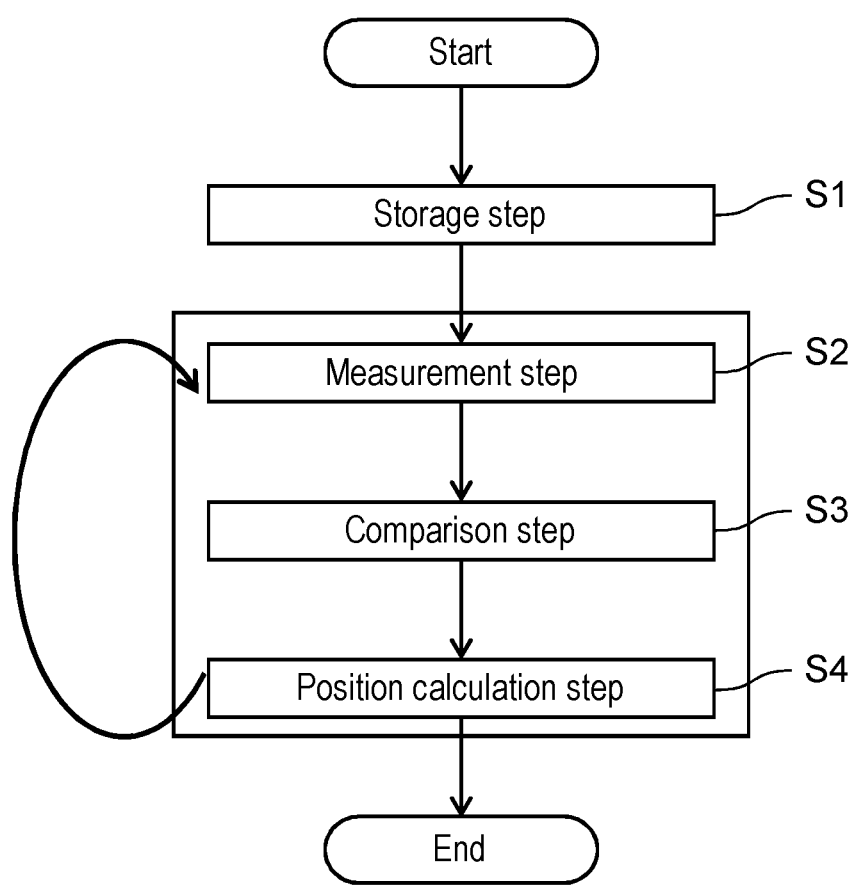
FIG. 2 is a flowchart of a recognition process of the mobile robot according to Embodiment 1.

Next, a recognition method of the mobile robot 100 will be explained as follows. FIG. 2 is a flowchart of the recognition process of the mobile robot 100 according to Embodiment 1.

Figure 3:
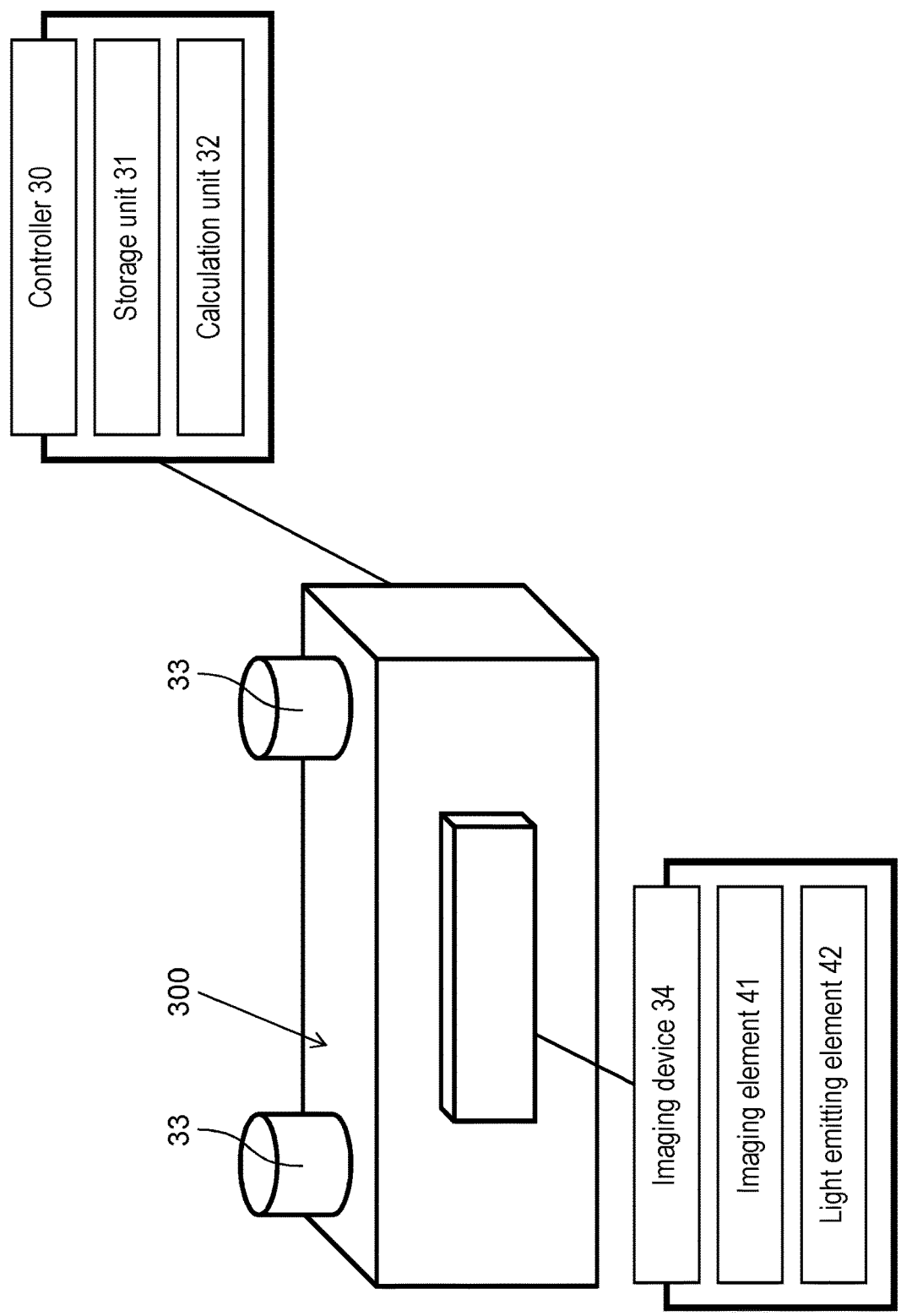
FIG. 3 is a schematic view of a mobile robot recognition device according to Embodiment 1.

First, a mobile robot recognition device 300 is prepared before recognition of the mobile robot 100 is performed. FIG. 3 is a schematic view of the mobile robot recognition device 300 according to Embodiment 1. The mobile robot recognition device 300 has at least a controller 30 including a storage unit 31 and a calculation unit 32 and a range scanner 33, which recognizes a position and an orientation of the mobile robot 100.

The range scanner 33 emits electromagnetic waves such as laser, infrared rays and millimeter waves to measure a distance to a structure by reflected waves. The measured information is inputted to the controller 30. As an example of the range scanner 33, for example, a laser range finder can be cited.

A plurality of range scanners 33 may be installed in the mobile robot recognition device 300. In this case, the mobile robot recognition device 300 can recognize the position and the orientation of the mobile robot 100 with higher accuracy.

Next, a storage step S1 shown in FIG. 2 is performed.

Figure 4:
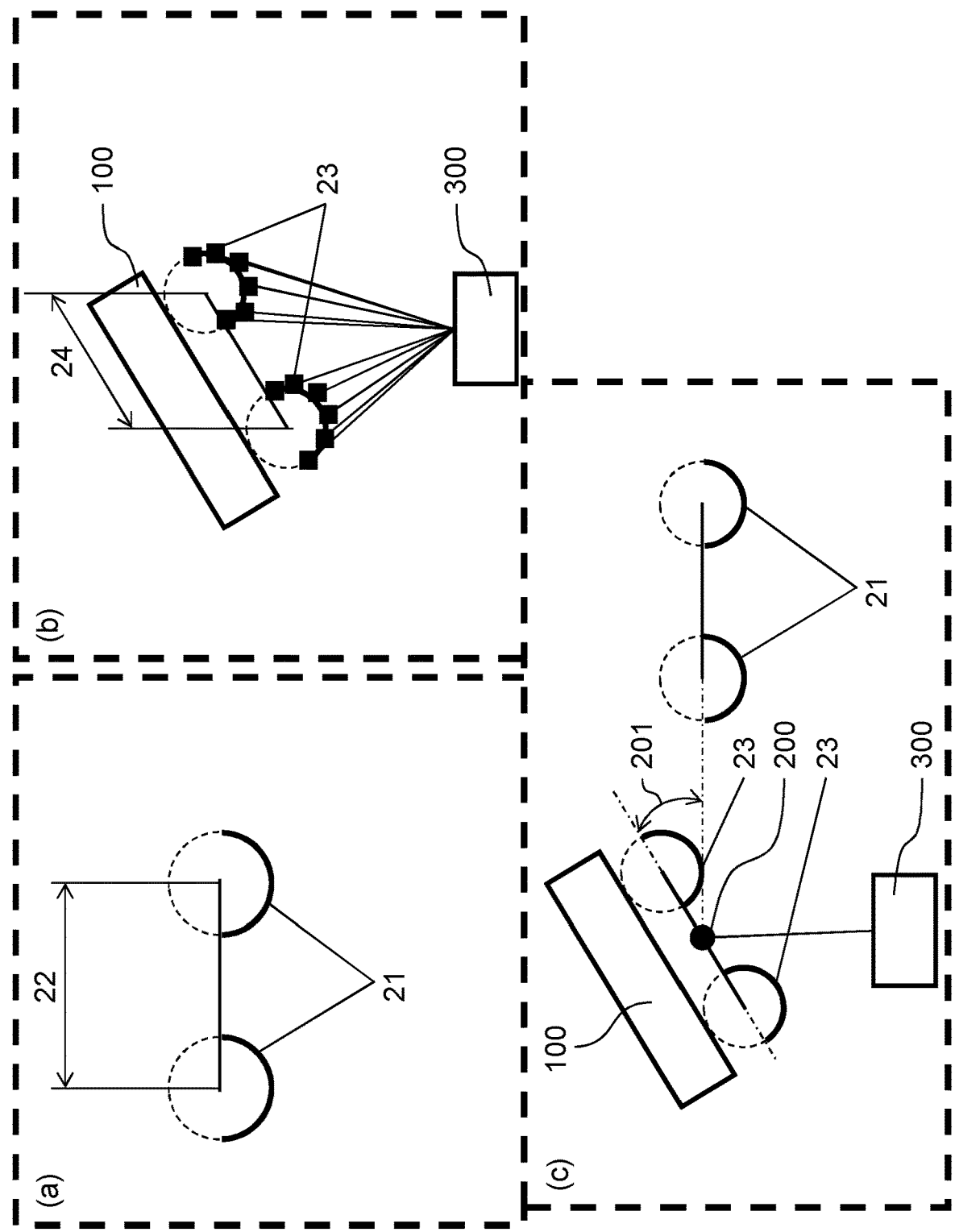
FIG. 4 is a schematic view of the recognition process using a sensor according to Embodiment 1.

(a) of FIG. 4 is a top view of the first reflection parts 5 stored in the storage step S1. In the storage step S1, the storage unit 31 stores first stored shapes 21 and a first stored distance 22.

The first stored shape 21 is a shape corresponding to a semicircular shape when the two first reflection parts 5 are seen from the rotation axis direction.

The first stored distance 22 is a two-dimensional distance between the two first reflection parts 5 when the two first reflection parts 5 are seen from the rotation axis direction. Positions of reference points on the two first reflection parts 5 for calculating the first stored distance 22 do not particularly matter. In Embodiment 1, a distance between central positions of the two first stored shapes 21, namely, a distance between the rotation axes of the two reflection parts 5 is stored as the first stored distance 22.

The position and the orientation of the mobile robot 100 at the time of being stored in the storage step S1 are references of the position and the orientation of the mobile robot 100 recognized in the following steps.

The storage step S1 may be performed in advance, not being performed continuously with the following steps.

Next, a measurement step S2 shown in FIG. 2 is performed.

(b) of FIG. 4 is a top view of the first reflection parts 5 measured in the measurement step S2. In the measurement step S2, first, the range scanners 33 emit electromagnetic waves to measure reflected waves. Next, the calculation unit 32 detects two first measurement shapes 23 shown in (b) of FIG. 4 from measurement data of reflected waves. Here, the first measurement shapes 23 are approximately the same as the first stored shapes 21. Then, a first measurement distance 24 which is a distance between the two first measurement shapes 23 is calculated. Here, positions of reference points on the two first measurement shapes 23 for calculating the first measurement distance 24 are approximately the same as the positions of the reference points of the first stored distance 22.

As a way of discriminating reflected waves reflected by the first reflection parts 5 from reflected waves reflected by other structures installed in a measurable area, for example, there is a method of determining reflected waves having reflection intensities of a certain level or more as reflected waves reflected by the first reflection parts 5. In this case, the storage unit 31 further stores a reflection intensity of the first reflection surface 6 to be set as a reference value in the storage step S1. In order to detect an error, desired differences are provided in the vicinity of the reflection intensity of the first reflection surface 6 stored in the storage step S1 and a value obtained by taking the differences into consideration is preferably used as a reference value.

Next, a comparison step S3 shown in FIG. 2 is performed.

In the comparison step S3, the calculation unit 32 compares the first stored distance 22 stored in the storage unit 31 with the first measurement distance 24 measured in the measurement step S2.

When a difference between the compared distances is within a predetermined range of errors, it is determined that the first reflection parts 5 are correctly measured in the measurement step S2, and the process proceeds to the next step. When the difference is not within the predetermined range or errors, it is determined that the two first measurement shapes 23 measured in the measurement step S2 do not correspond to the first reflection parts 5, and the measurement step S2 is performed again.

Here, the predetermined range of errors is preferably plus/minus 20% with respect to the first storage distance 22.

Next, a position calculation step S4 shown in FIG. 2 is performed. In the position calculation step S4, the position and the orientation of the mobile robot 100 with respect to the stored point of time are calculated.

(c) of FIG. 4 is a top view in which the first reflection parts 5 stored in the storage step S1 and the first reflection parts 5 measured in the measurement step S2 are aligned side by side. In the position calculation step S4, the calculation unit 32 calculates a recognition position 200 and a recognition angle 201.

The recognition position 200 is an arbitrary position on a line passing through central positions of the two first measurement shapes 23. In Embodiment 1, a central position in a line segment connecting the central positions of the two first measurement shapes 23 is determined as the recognition position 200, but it is not limited to this. When the recognition position 200 is calculated, a relative position of the first reflection parts 5 with respect to the stored point of time can be recognized.

The recognition angle 201 is an angle made by the line segment connecting the central positions of the two first measurement shapes 23 measured in the measurement step S2 and a line segment connecting central positions of the two first stored shapes 21 stored in the storage step S1. When the recognition angle 201 is calculated, a relative angle of the first reflection parts 5 with respect to the stored point of time can be recognized.

The steps S2 to S4 are repeated in this manner, the relative position and the relative angle of the first reflection parts 5 with respect to the stored point of time can be calculated. Therefore, the position and the orientation of the mobile robot 100 with respect to the stored point of time can be recognized.

However, application of the above recognition method is limited to an environment where the range scanners 33 can detect reflection intensities of the reflection parts. Therefore, for example, in a case where the mobile robot recognition device 300 leans and electromagnetic waves of the range scanner 33 are not applied to the reflection part, there is a possibility that it is difficult to recognize the position correctly.

<Recognition Method Using Imaging Device>

Accordingly, the mobile robot recognition device 300 may include an imaging device 34 as shown in FIG. 3. The imaging device 34 can be used for an application of searching for the mobile robot 100 as a measurement target and an application of recognizing the position and the orientation of the mobile robot 100.

The imaging device 34 includes an imaging element 41 and a light emitting element 42, inputting recorded videos and images to the controller 30.

When the mobile robot recognition device 300 has the imaging device 34, it is preferable that the first reflection surfaces 6 are formed of a material particularly reflecting light in electromagnetic waves. That is because it is necessary to be imaged by the imaging device 34.

Figure 5:
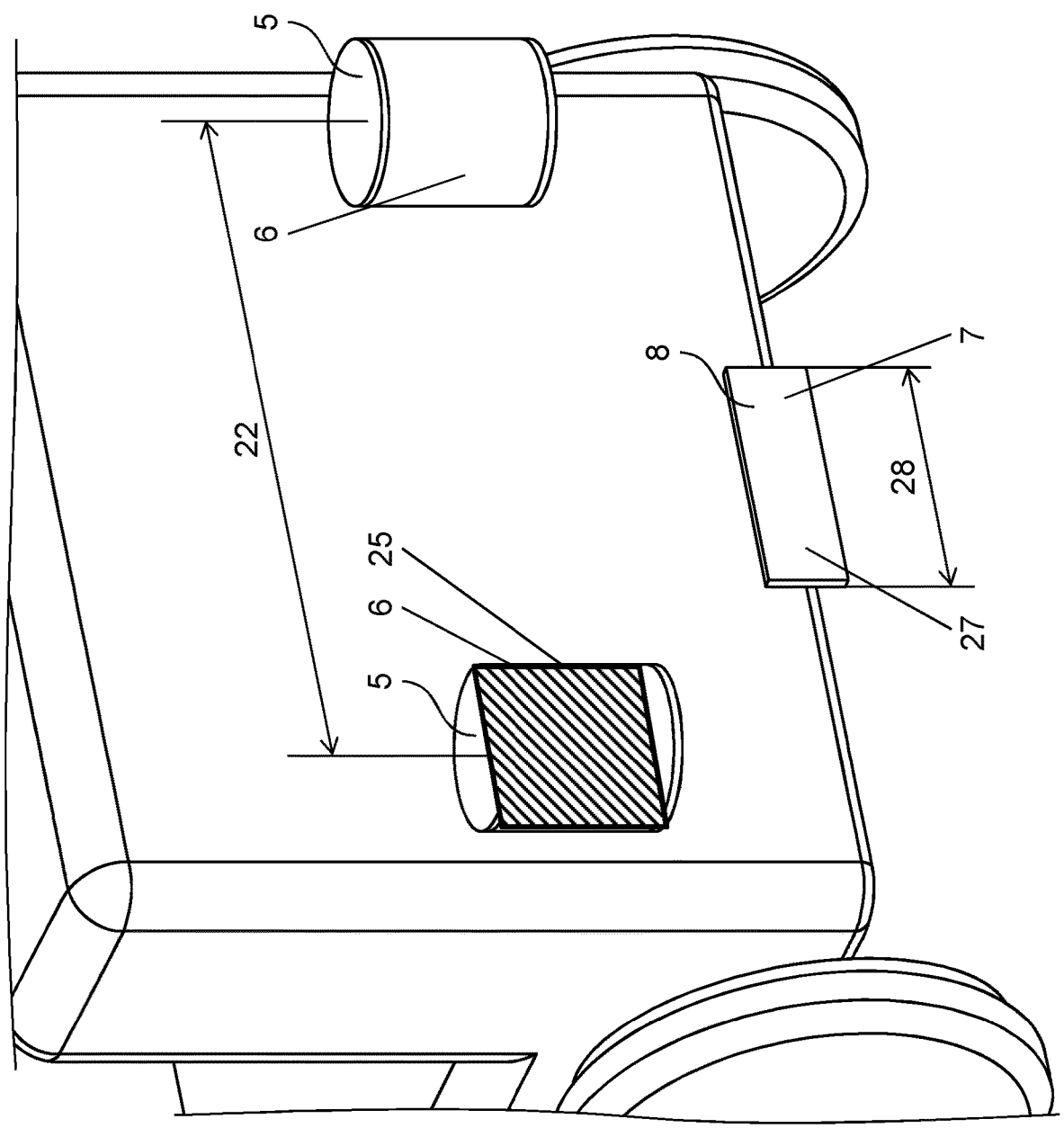
FIG. 5 is a schematic enlarged view in the vicinity of first reflection parts according to Embodiment 1.

FIG. 5 is a schematic enlarged view in the vicinity of the first reflection parts 5 according to Embodiment 1.

When the mobile robot recognition device 300 has the imaging device 34, the storage unit 31 further stores first cross-sectional shapes 25 of the two first reflection parts 5 and a positional relation between the two first cross-sectional shapes 25 in the storage step S1.

The first cross-sectional shapes 25 are cross-sectional shapes of the two first reflection surfaces 6 when the two first reflection parts 5 are seen from a normal line direction of the reference surface. Preferably, the first reflection surfaces 6 exist on the entire surfaces of respective side surfaces of the two first reflection parts 5 divided by the reference surface, and the cross sections are stored as the first cross-sectional shapes 25. More preferably, the first reflection surfaces 6 exist on the entire side surfaces of the two first reflection parts 5 and the cross sections are stored as the first cross-sectional shapes 25.

The imaging device 34 searches for a structure corresponding to the stored first cross-sectional shapes 25 and the positional relation thereof in the measurement step S2. As the first reflection parts 5 have the rotating body shape, the first cross-sectional shapes 25 do not change if the orientation of the mobile robot 100 changes, therefore, searching by the imaging device 34 is possible.

As a searching method, for example, in a case where relative positions in a height direction are stored as the positional relation of the two first cross-sectional shapes 25, two cross-sectional shapes having approximately the same cross-sectional shape as the first cross-sectional shapes 25 and the above positional relation are searched from structures. There is a case where a distance between cross-sectional shapes corresponding to the two first cross-sectional shapes 25 differ when the mobile robot 100 faces an oblique direction. In order to prepare for such situation, a distance in a case where the distance between the two first cross-sectional shapes 25 becomes maximum is stored in the storage unit 31, and cross-sectional shapes with a distance equal to or less than the above distance as well as having approximately the same shapes as the first cross-sectional shapes 25 can be searched.

After that, the calculation unit 32 determines an area where a structure corresponding to the stored positional relation and the first cross-sectional shapes 25 exists as an area where a measurement target exists in the measurement step S2. Then, the range scanner 33 measures reflected waves in the area where the measurement target exists.

When the mobile robot recognition device 300 having the imaging device 34 as described above is used, the area where the mobile robot 100 exists can be specified with higher accuracy and misrecognition of the mobile robot recognition device 300 can be reduced.

Figure 6:
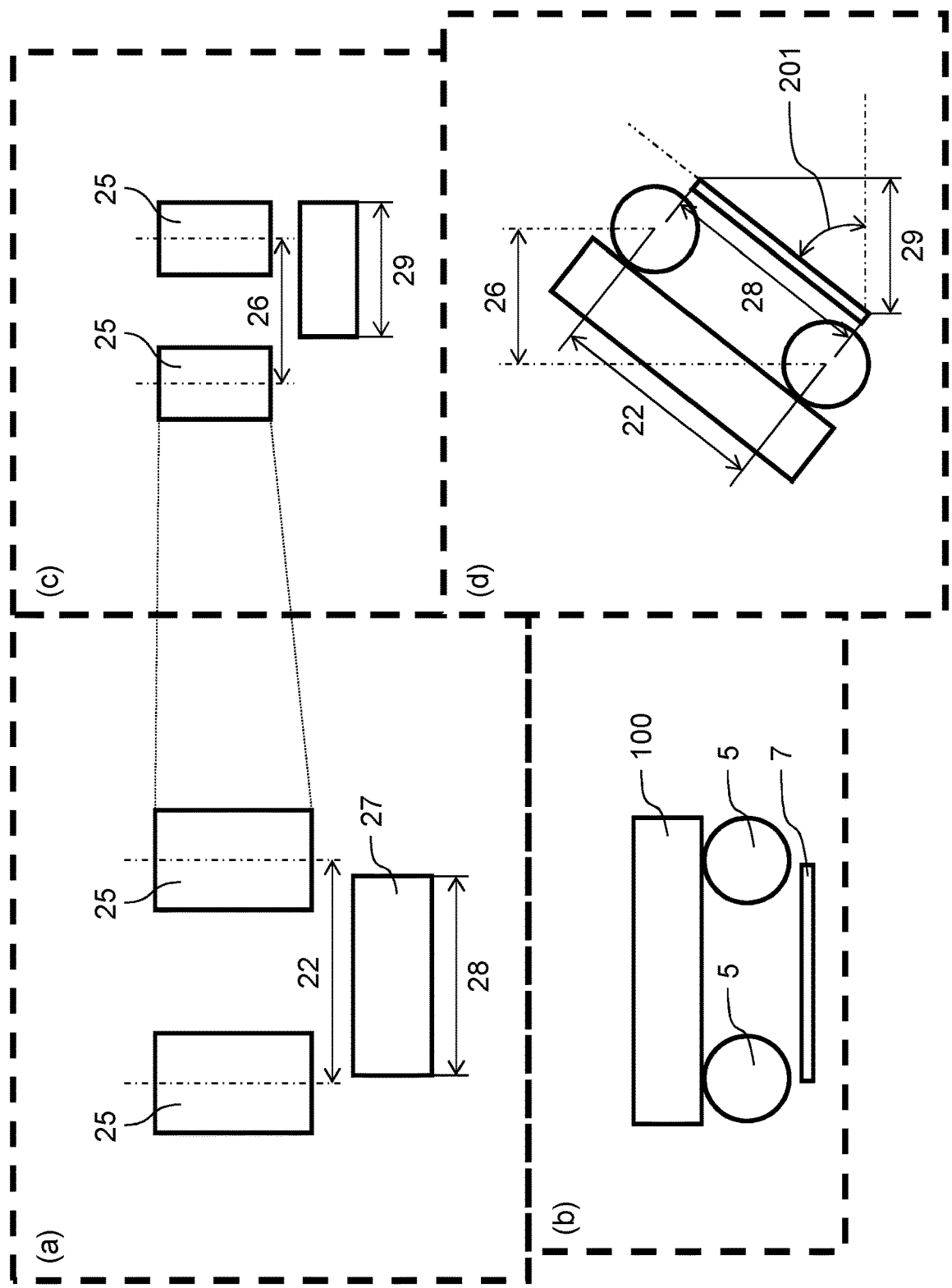
FIG. 6 is a schematic view of the recognition process using an imagine device according to Embodiment 1.

The position and the orientation of the mobile robot 100 can be recognized with further higher accuracy by using the imaging device 34. (a) of FIG. 6 is a schematic cross-sectional view in the vicinity of the first reflection parts 5 stored in the storage step S1, (b) of FIG. 6 is a top view in the vicinity of the first reflection parts 5 stored in the storage step S1, (c) of FIG. 6 is a schematic cross-sectional view in the vicinity of the first reflection parts 5 measured in the measurement step S2 and (d) of FIG. 6 is a top view in the vicinity of the first reflection parts 5 measured in the measurement step S2.

The calculation unit 32 may further compare relative sizes and imaged positions between the stored first cross-sectional shapes 25 and the first cross-sectional shapes 25 measured in the measurement step S2 in the position calculation step S4.

According to the above, how long the mobile robot has moved with respect to the imaging device 34 from the position of the mobile robot 100 at the stored point of time can be calculated. Therefore, the position of the mobile robot 200 can be recognized.

The calculation unit 32 may further compare a second measurement distance 26 with the first stored distance 22 in the position calculation step S4.

The second measurement distance 26 is a distance of first cross-sectional shapes 25 measured in the measured step S2. Positions of reference points on the two first cross-sectional shapes for calculating the second measurement distance 26 are approximately the same as the positions of the reference points of the first stored distance 22.

As shown in (d) of FIG. 6, an angle made by a hypotenuse and a base in a triangle with the first stored distance 22 as a hypotenuse and the second measurement distance 26 as a base is calculated. Accordingly, how much the orientation of the mobile robot 100 has changed with respect to the orientation of the mobile robot 100 at the stored point of time can be calculated. Therefore, the orientation of the mobile robot 100 can be recognized.

When the mobile robot recognition device 300 having the imaging device 34 as described above is used, the position and the orientation of the mobile robot 100 can be recognized with high accuracy.

According to the above recognition method, it is sufficient that the mobile robot 100 has at least two first reflection parts 5. In order to recognize the position and the orientation of the mobile robot 100 with higher accuracy, the mobile robot 100 can further be provided with a second reflection part 7.

The second reflection part 7 has a cubic shape or a rectangular parallelepiped shape, and has a second reflection surface 8 at least on one surface with the largest area in surfaces.

When a surface passing through rotation axes of the two first reflection parts 5 is a reference surface, the second reflection surface 8 is parallel to the reference surface.

The second reflection part 7 may have surfaces reflecting electromagnetic waves on surfaces other than one surface with the largest area in surfaces. For example, when surfaces reflecting electromagnetic waves are formed on four surfaces parallel to one surface including the rotation axis of the first reflection part 5, the cross-sectional shape changes in accordance with change of the orientation of the mobile robot 100 in a later-described recognition process, therefore, recognition can be made accurately.

Moreover, the second reflection surface 8 is arranged in the same direction as the first reflection surfaces 6. That is, when the first reflection surface 6 possessed by one first reflection part 5 is seen from the front, the first reflection surface 6 possessed by the other reflection part 5 also faces the front, then, the second reflection surface 8 faces the front, too.

The second reflection part 7 is arranged so that a long side of the second reflection surface 8 is perpendicular to the rotation axis of the first reflection part 5. However, this shall not apply to the case where the second reflection part 7 has the cubic shape as all sides are the same length.

The second reflection surface 8 is arranged perpendicular to a travel surface of the mobile robot 100. Here, the travel surface of the mobile robot 100 is a horizontal surface on which the drive wheels 2 and the driven wheels 3 are grounded.

The travel surface of the mobile robot 100 is not always a flat surface. Therefore, the mobile robot 100 may run on a curved surface, an uneven surface, an inclined surface and the like. In this case, the orientation in a vertical direction of the mobile robot 100 is changed. Although recognition can be made by a later-described method even in the mobile robot 10 with a simple structure, the first reflection parts 5 and the second reflection part 7 can be configured so as to change orientations in the vertical direction so as to correspond to the travel surface when highly accurate recognition is required. For example, weights are attached to lowest parts of the first reflection parts 5 and the second reflection part 7 to allow these components to maintain the same orientations by gravity.

When the mobile robot 100 has the second reflection part 7, the storage unit 31 further stores a second cross-sectional shape 27 and a second stored distance 28 in the storage step S1 as shown in FIG. 5.

The second cross-sectional shape 27 is a cross-sectional shape of the second reflection surface 8 obtained when the second reflection part 7 is seen from a normal line direction of the reference surface.

The second stored distance 28 is a length in a direction perpendicular to the rotation axes of the first reflection parts 5 obtained when the second reflection part 7 is seen from the normal line direction of the reference surface.

The imaging device 34 further searches for a structure corresponding to the second cross-sectional shape 27 in the measurement step S2. As the second reflection part 7 has the cubic shape or the rectangular parallelepiped shape, the second cross-sectional shape 27 is shortened in the direction perpendicular to the rotation axes of the first reflection parts 5 when the orientation of the mobile robot 100 changes. Accordingly, it is preferable to search for a rectangular structure in which the direction parallel to the rotation axes of the first reflection parts 5 is the same.

After that, the calculation unit 32 determines an area where a structure corresponding to the first cross-sectional shape 25 and the second cross-sectional shape 27 exists as an area where a measurement target exists. Then, the range scanner 33 measures reflection waves in the area where the measurement target exists.

When the mobile robot recognition device 300 having the imaging device 34 as described above is used, the area where the mobile robot 100 exists can be specified with higher accuracy and misrecognition of the mobile robot recognition device 300 can be reduced.

The calculation unit 32 may further compare a third measurement distance 29 with the second stored distance 28 in the position calculation step S4.

The third measurement distance 29 is a length in a direction perpendicular to the rotation axes of the first reflection parts 5 in the second reflection part 7 measured in the measurement step S2.

As shown in (d) of FIG. 6, an angle made by a hypotenuse and a base in a triangle with the second stored distance 28 as a hypotenuse and the third measurement distance 29 as a base is calculated. Accordingly, how much the orientation of the mobile robot 100 has changed with respect to the orientation of the mobile robot 100 at the stored point of time can be calculated. Therefore, the orientation of the mobile robot 100 can be recognized.

In the above recognition method, the second measurement distance 26 is compared with the first stored distance 22, and the third measurement distance 29 is compared with the second stored distance 28 respectively in the position calculation step S4. Then, the recognition angle 201 of the mobile robot 100 is calculated from a difference of distances as the compared results. Basically, any of the above two comparison methods may be performed for calculating the recognition angle 201. The two first cross-sectional shapes 25 measured by the imaging device 34 in the measurement step S2 overlap depending on the orientation of the mobile robot 100, and it may be difficult to calculate the second measurement distance 26. Accordingly, the latter is preferentially used in the above two comparison methods.

When the mobile robot 100 having the second reflection part 7 as described above is used, the position and the orientation of the mobile robot 100 can be recognized with high accuracy.

Accordingly, the orientation of the mobile robot 100 can be recognized in more various environments as compared with the structure only having the range scanner 33.

The mobile robot 100 can further includes an operation unit 16 at least having a handle, an operation panel and so on for operating the robot. The robot controller 10 can control the travel drive unit 4 to drive through the drive controller 11 based on an operation instruction from the operation unit 16.

The mobile robot recognition device 300 in the above recognition method includes the imaging device 34 having the light emitting element 42. Here, when there are plural mobile robots 100 in a visual field of the imaging device 34, respective first reflection parts 5 and the second reflection parts 7 reflect light from the light emitting element 42. Then, the imaging element 41 captures all these reflected waves. Accordingly, when plural mobile robots 100 exist, the mobile robot recognition device 300 is not capable of specifying the mobile robot 100 desired to be recognized.

Accordingly, plural mobile robots 100 may change shapes of the first reflection parts 5 and the second reflection parts 7 respectively. For example, the first stored shapes 21, the first stored distance 22, the second stored distance 28 and so on are changed by each mobile robot 100. Accordingly, even when there are plural mobile robots 100 in the visual field of the mobile robot recognition device 300, only the specified mobile robot 100 desired to be recognized can be recognized.

The plural mobile robots 100 also may change reflection intensities of the first reflection parts 5 and the second reflection parts 7 respectively. Accordingly, even when there are plural mobile robots 100 in the visual field of the mobile robot recognition device 300, misrecognition of robots other than the specified mobile robot 100 desired to be recognized can be reduced.

It is further preferable that each mobile robot 100 is provided with a light emitting device illuminating respective first reflection parts 5 and the second reflection part 7. In this case, only the light emitting device of the mobile robot 100 desired to be recognized emits light in plural mobile robots 100, thereby capturing only the first reflection parts 5 and the second reflection part 7 emitting light by the mobile robot recognition device 300. Therefore, even when plural mobile robots 100 exist in the visual field of the mobile robot recognition device 300, only the specified mobile robot 100 desired to be recognized can be recognized. In this case, it is not always necessary that the mobile robot recognition device 300 has the light emitting element 42 in the imaging device 34. Even when the imaging device 34 including the light emitting element 42 is provided, the same position recognition method can be used by not using the light emitting element 42.

<Application Example of Recognition Method>

The above recognition method can be used for recognition of the position and the orientation of the mobile robot 100. The position is recognized by fixing the place of the mobile robot recognition device 300 and installing the first reflection parts 5 and so on in a conveyance robot, a working robot or the like, for example, in a facility or a factory. It is also possible to control the mobile robot 100 by transmitting an instruction to the robot controller 10 provided in the mobile robot 100.

Figure 7:
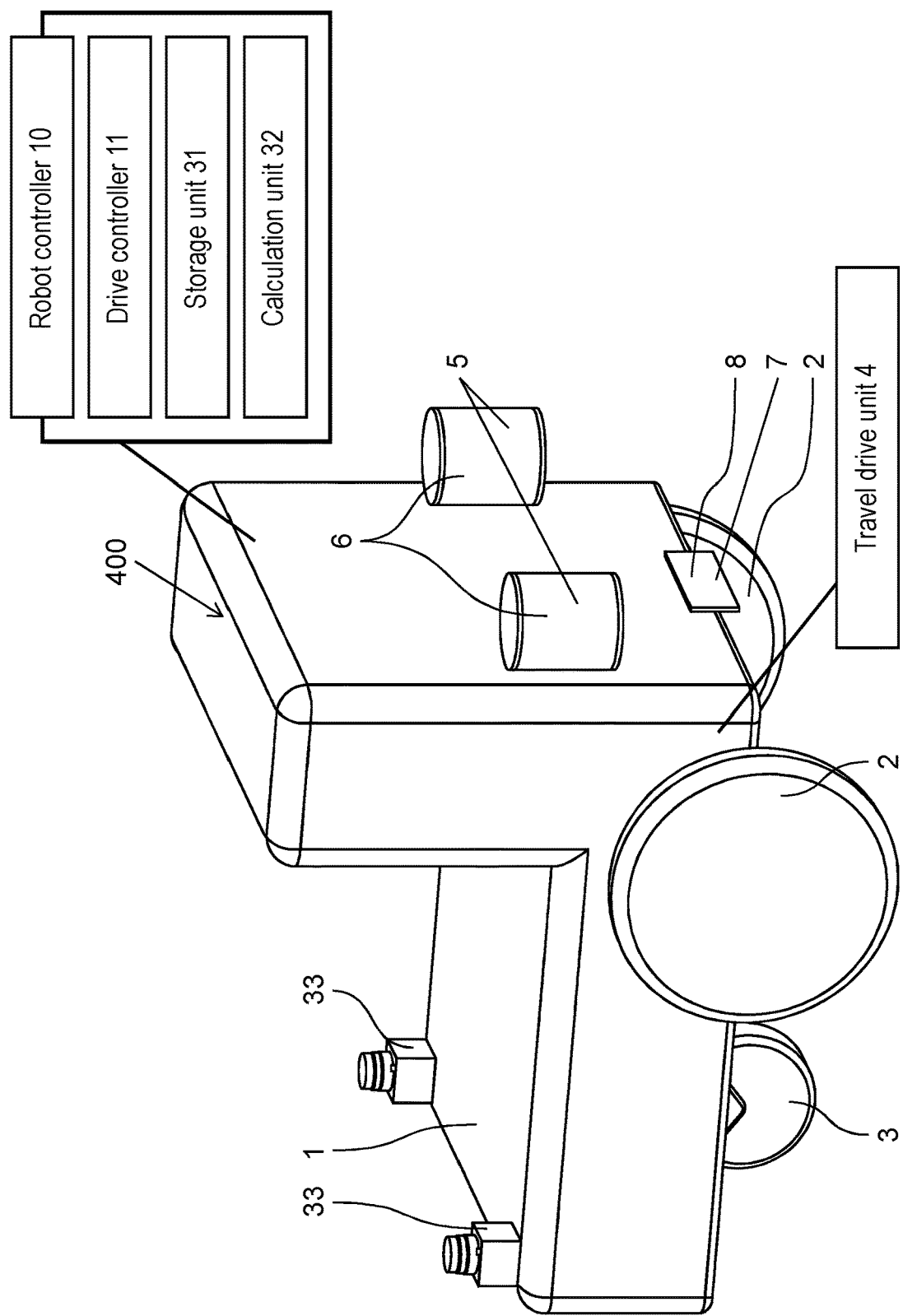
FIG. 7 is a schematic view of a mobile recognition robot doubling as the mobile robot recognition device according to Embodiment 1.

The recognition method can be applied for a structure in which the mobile robot recognition device 300 itself moves. The structure will be explained with reference to the drawings. FIG. 7 is a schematic view of a mobile recognition robot 400 doubling as the mobile robot recognition device 300. The mobile recognition robot 400 can be used as an alternate for the mobile robot 100 and the mobile robot recognition device 300.

The mobile recognition robot 400 includes the first reflection parts 5 and the range scanners 33. The storage unit 31 and the calculation unit 32 are included in the robot controller 10. The mobile recognition robot 400 may further include the second reflection part 7.

Here, a plurality of mobile recognition robots 400 are prepared, the plural mobile recognition robots 400 can recognize their positions. The calculation unit 32 calculates movement tracks based on obtained positional information of other mobile recognition robots 400. As movement tracks, there are a track of a movement following another mobile recognition robot 400, a track of a movement avoiding another mobile recognition robot 400 and so on.

It is preferable that the movement recognition robot 400 recognizes obstacles on a traveling direction or other mobile recognition robots 400. Accordingly, the range scanners 33 are preferably installed at the front in the traveling direction. The first reflection parts 5 and the second reflection part 7 are preferably installed at the rear in the traveling direction or behind the mobile recognition robot 400 for being easily recognized by the range scanners 33.

Another Example 1 of Embodiment 1

Figure 8:
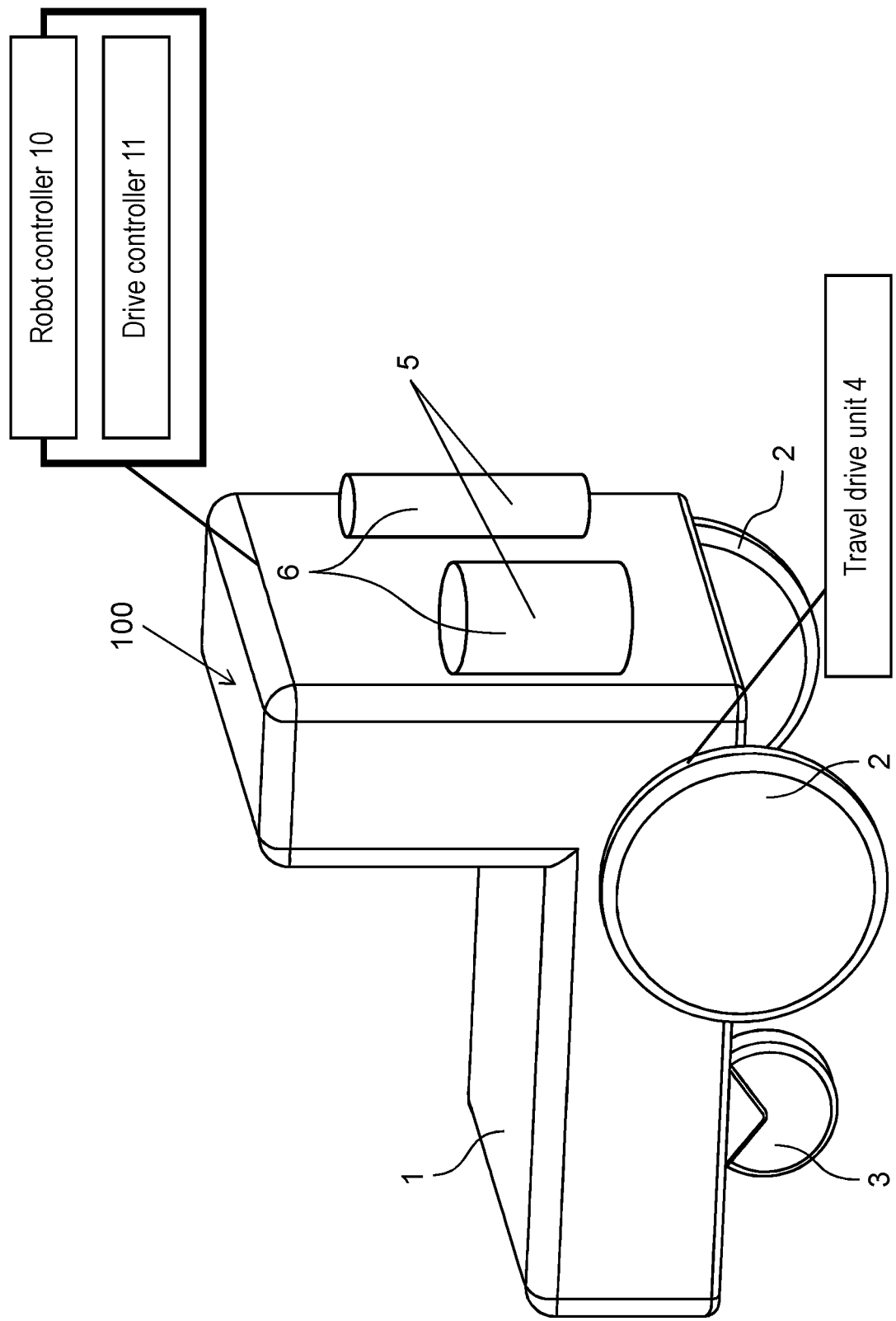
FIG. 8 is a schematic view of a mobile robot according to another example 1 of Embodiment 1.

In order to reduce misrecognition of the mobile robot recognition device 300, respective structures of the two first reflection parts 5 can be changed. FIG. 8 is a schematic view of the mobile robot 100 according to another example 1 of Embodiment 1.

The two first reflection parts 5 differ in diameters of circles when seen from the rotation axis direction.

The two first reflection parts 5 also differ in heights when seen from the direction perpendicular to the rotation axes.

Here, the first reflection part 5 having a larger diameter of the circle when seen from the rotation axis direction in the two first reflection parts 5 is lower in height as compared with the other first reflection part 5 when seen from the direction perpendicular to the rotation axis.

The mobile robot 100 having the above structure can reduce misrecognition of the mobile robot recognition device 300 even when the second reflection part 7 is not provided.

The above mobile robot 100 may be provided with the second reflection part 7 for further reducing misrecognition of the mobile robot recognition device 300.

Another Example 2 of Embodiment 1

Figure 9:
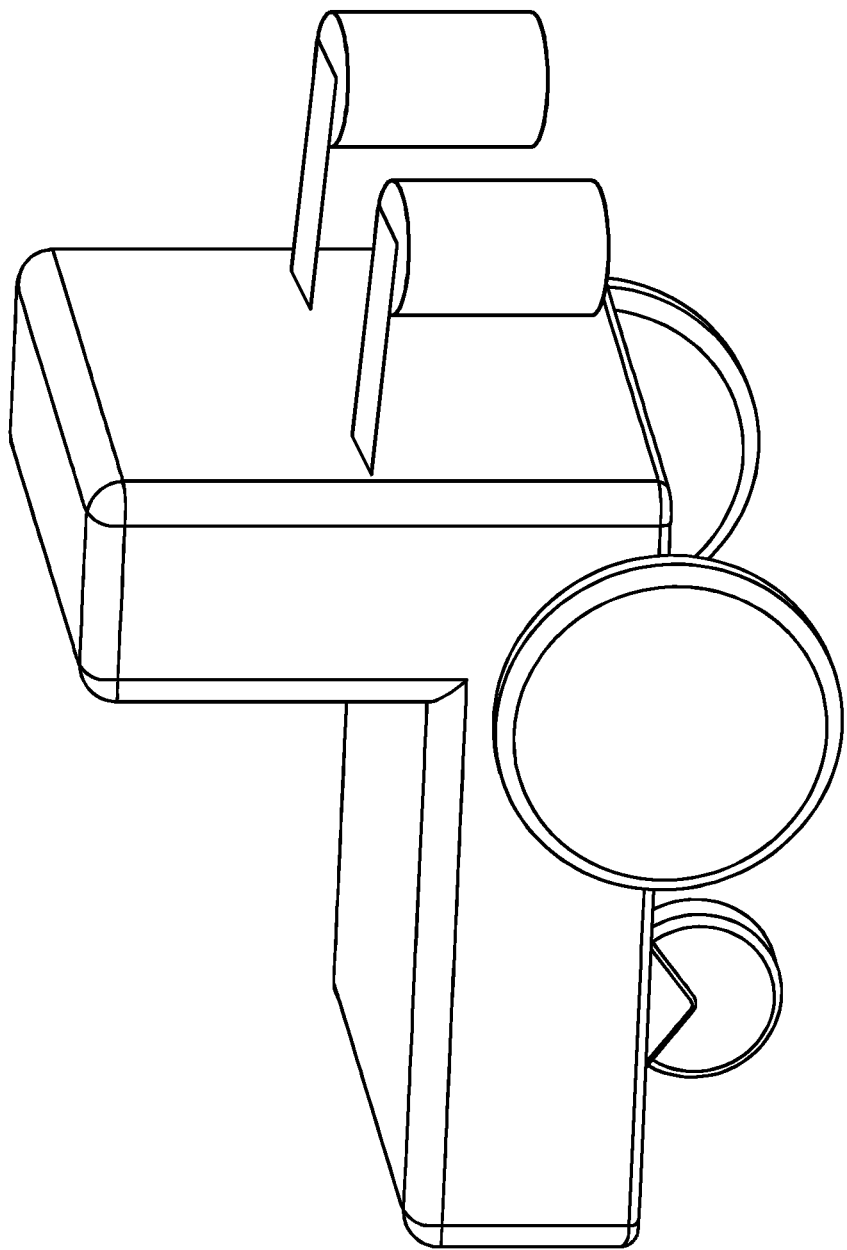
FIG. 9 is a schematic view of a mobile robot according to another example 2 of Embodiment 1.

In order to reduce misrecognition of the mobile robot recognition device 300, arrangement relation of two first reflection parts 5 can be changed. FIG. 9 is a schematic view of the mobile robot 100 according to another example 2 of Embodiment 1.

The two first reflection parts 5 are installed away from the main body 1.

Such mobile robot 100 can recognize the first reflection parts 5 also from more directions by being installed so that the main body 1 does not overlap with the first reflection parts 5.

The two first reflection parts 5 are preferably attached at surfaces other than respective first reflection surfaces 6 by using metal fittings or the like. Although the two first reflection parts 5 are hung by attaching metal fittings on upper surfaces thereof in FIG. 9, other forms may be adopted.

Operation and Effect of Embodiment 1

Operation and effect of the mobile robot having the above structure will be explained below.

According to Embodiment 1, the mobile robot has at least two first reflection parts having the rotating body shape, in which the first reflection parts are configured so that the reflection surface angle made by points passing through the rotation axis and both ends of the first reflection surface is 90 degrees or more and 360 degrees or less when seen from the rotation axis direction. Accordingly, the first reflection parts can reflect electromagnetic waves and allows the mobile robot recognition device to recognize the position and the orientation.

Also in the two first reflection parts, respective rotation axes are parallel to each other. Accordingly, the same sensors mounted on the mobile robot recognition device can recognize two first reflection parts. Therefore, the mobile robot recognition device can recognize the mobile robot more easily.

When the first reflection parts 5 are seen from the rotation axis direction, the reflection surface angle is 180 degrees or more and 360 degrees or less. Accordingly, the range in which the mobile robot can reflect electromagnetic waves is widened. Therefore, even when one sensor is mounted on the mobile robot recognition device, the device can recognize the mobile robot easily.

When the two first reflection parts are seen from the rotation axis direction as well as the same direction, respective reflection surface angles are 180 degrees or more when overlapping with each other. That is, both two first reflection surfaces face the same direction. Accordingly, it is possible to avoid the situation where the mobile robot recognition device is not capable of recognizing the two first reflection parts at the same time and the device can recognize the mobile robot more easily.

The two first reflection parts have first reflection surfaces on the entire surfaces of at least one-side surfaces of respective side surfaces divided by the reference surface when the surface passing through the rotation axes of the two first reflection parts 5 is the reference surface. Accordingly, it is possible to avoid the situation where the mobile robot recognition device is not capable of recognizing the two first reflection parts at the same time and the device can recognize the mobile robot more easily.

The mobile robot further includes the second reflection part having a cubic shape or a rectangular parallelepiped shape, and the second reflection part has the second reflection surface on one surface with the largest area in surfaces. The second reflection surface is parallel to the reference surface. Accordingly, the reflection part recognized by the mobile robot recognition device is increased and the mobile robot can be recognized more easily.

The second reflection surface is arranged in the same direction as the first reflection surfaces. Accordingly, it is possible to avoid the situation where the mobile robot recognition device is not capable of recognizing the two first reflection parts and the second reflection surface at the same time and the device can recognize the mobile robot more easily.

The second reflection part is arranged so that a long side of the second reflection surface is perpendicular to the rotation axes of the first reflection parts. Accordingly, change in the cross-sectional shape of the second reflection part is increased when the orientation of the mobile robot changes, which allows the mobile robot recognition device to recognize the mobile robot more easily.

The second reflection surface is arranged so as to be perpendicular to the travel surface of the mobile robot. The first reflection parts and the second reflection part are fixed by three axes with respect to the mobile robot, therefore, the mobile robot recognition device can recognize the mobile robot more easily.

When the two first reflection parts are seen from the rotation axis direction, diameters of circles differ. Accordingly, cross-sectional shapes do not completely overlap with each other when the two first reflection parts are seen from different directions. Accordingly, the mobile robot recognition device can recognize the mobile robot more easily.

Moreover, when the two first reflection parts are seen from the direction perpendicular to the rotation axes, heights differ. Accordingly, cross-sectional shapes do not completely overlap with each other when the two first reflection parts are seen from different directions. Accordingly, the mobile robot recognition device can recognize the mobile robot more easily.

The first reflection part with a larger diameter of the circle when seen from the rotation axis direction in the two first reflection parts is lower in height as compared with the other first reflection part when seen from the direction perpendicular to the rotation axis. Accordingly, cross-sectional shapes do not completely overlap with each other when the two first reflection parts are seen from different directions and any of portions in a vertical width and a horizontal width protrudes in both two first reflection parts. Accordingly, the mobile robot recognition device can recognize the mobile robot easily.

As the mobile robot 100 according to Embodiment 1, a form of a wheelchair shape in which the pair of drive wheels 2, the pair of driven wheels 3 and the travel drive unit 4 constitute the travel drive device is assumed. However, the range in which the present disclosure can be applied is not limited to the above, and the present disclosure can be applied to overall mobile robots such as an autonomous mobile robot and a conveyance robot.

Embodiment 2

Next, a mobile robot according to Embodiment 2 will be explained with reference to the drawings. FIG. 10 is a schematic view of a mobile robot 500 according to Embodiment 2.

The mobile robot 500 has at least the main body 1, the drive wheels 2, the driven wheels 3, the travel drive unit 4, the robot controller 10 including the drive controller 11 and first reflection parts 55 having first reflection surfaces 56.

<Structure of Mobile Robot 500>

The travel drive unit 4 is formed by a drive device such as a motor, which enables forward/reverse rotation of a pair of drive wheels 2 independently. The pair of drive wheels 2, a pair of driven wheels 3 and the travel drive unit 4 constitute a travel drive device.

The robot controller 10 controls the travel drive unit 4 through the drive controller 11.

Figure 11A:
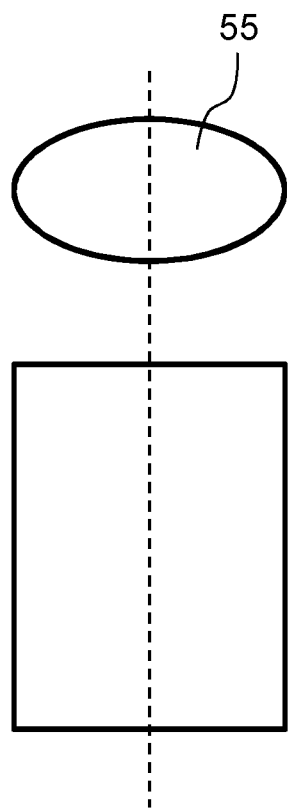
FIGS. 11A to 11C are schematic two-face views showing shapes of the first reflection parts according to Embodiment 2.
Figure 11B:
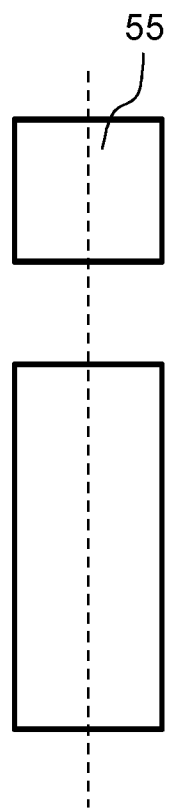
Figure 11C:
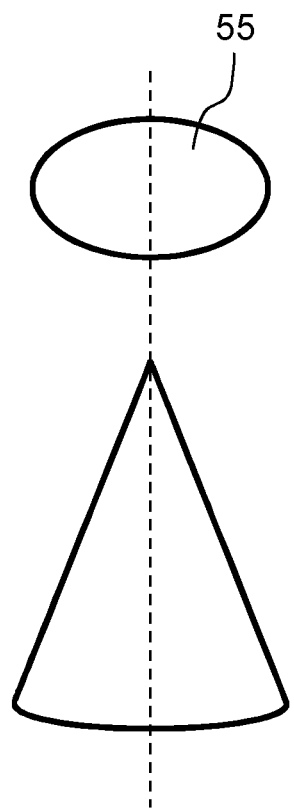

FIGS. 11A to 11C are schematic two-face views showing shapes of the first reflection parts 55 according to Embodiment 2.

The first reflection parts 55 according to Embodiment 2 have a shape of a figure in which cross-sectional shapes obtained by being cut in a direction perpendicular to a reference axis are symmetrical and continuous with respect to points passing through the reference axis.

Also in the first reflection parts 55, cross-sectional shapes obtained by being cut in the direction perpendicular to the reference axis are similar to each other.

The reference axis is an axis parallel to a normal line of the travel surface of the mobile robot 100. Here, the travel surface of the mobile robot 100 is a horizontal surface on which the drive wheels 2 and the driven wheels 3 are grounded.

The first reflection parts 55 may have a cylindrical shape in which a cross-sectional shape obtained by being cut in the direction perpendicular to the reference axis is an elliptical shape as shown in FIG. 11A as an example.

The first reflection part 55 may also have a prismatic shape in which a cross-sectional shape obtained by being cut in the direction perpendicular to the reference axis is a polygonal shape as shown in FIG. 11B as an example.

The first reflection part 55 may also have a conical shape in which a cross-sectional shape obtained by being cut in the direction perpendicular to the reference axis is an elliptical shape as shown in FIG. 11C as an example.

The first reflection parts 55 have first reflection surfaces 56 on side surfaces thereof.

The two first reflection parts 55 are arranged so that respective reference axes are parallel to each other.

It is preferable that the two first reflection parts 55 have the first reflection surface 56 so that respective reflection surface angles overlap with each other by 180 degrees or more when overlapping with each other and seen from the reference axis direction and the same direction. That is, both two first reflection surfaces 56 face the same direction as shown in FIG. 10.

When a surface passing through the reference axes of the two first reflection parts 55 is a reference surface, it is preferable that the two first reflection parts 55 have the first reflection surfaces 56 on the entire surfaces of at least one-side surfaces of respective side surfaces divided by the reference surface. That is, both two first reflection surfaces 56 face a one-side direction divided by the reference surface as shown in FIG. 10.

<Recognition Method Using Sensor>

Next, a recognition method of the mobile robot 500 will be explained as follows.

The basic flow of the recognition method is the same as the recognition process of the mobile robot 100 according to Embodiment 1, which is shown in FIG. 2.

However, in the recognition method using the same sensors as that of Embodiment 1, the shape stored in the storage step S1 may differ from the shape measured in the measurement step S2 when the first rotation parts 5 are not rotating bodies.

In that case, it is determined that the first reflection parts 55 can be correctly measured when a difference between the shape stored in the storage step S1 and the shape measured in the measurement step S2 is within a predetermined range of errors, and the process may proceed to the following step. In a case that a difference is not within the range of errors, it is determined that a reflected object measured in the measurement step S2 is not the first reflection part 55, and the measurement step S2 may be performed again.

Here, the predetermined range of errors is preferably plus/minus 20% with respect to the shape stored in the storage step S1.

When steps S2 to S4 are repeated as described above, the relative position and the relative angle of the first reflection parts 55 with respect to the stored point of time can be calculated. Therefore, the position and the orientation of the mobile robot 500 with respect to the stored point of time can be recognized.

However, the above recognition method includes a shape error, therefore, there is a possibility that the position is not capable of being recognized correctly.

<Recognition Method Using Imaging Device>

Accordingly, the recognition of the mobile robot 500 is performed by the imaging device 34 provided in the mobile robot recognition device 300.

Figure 12:
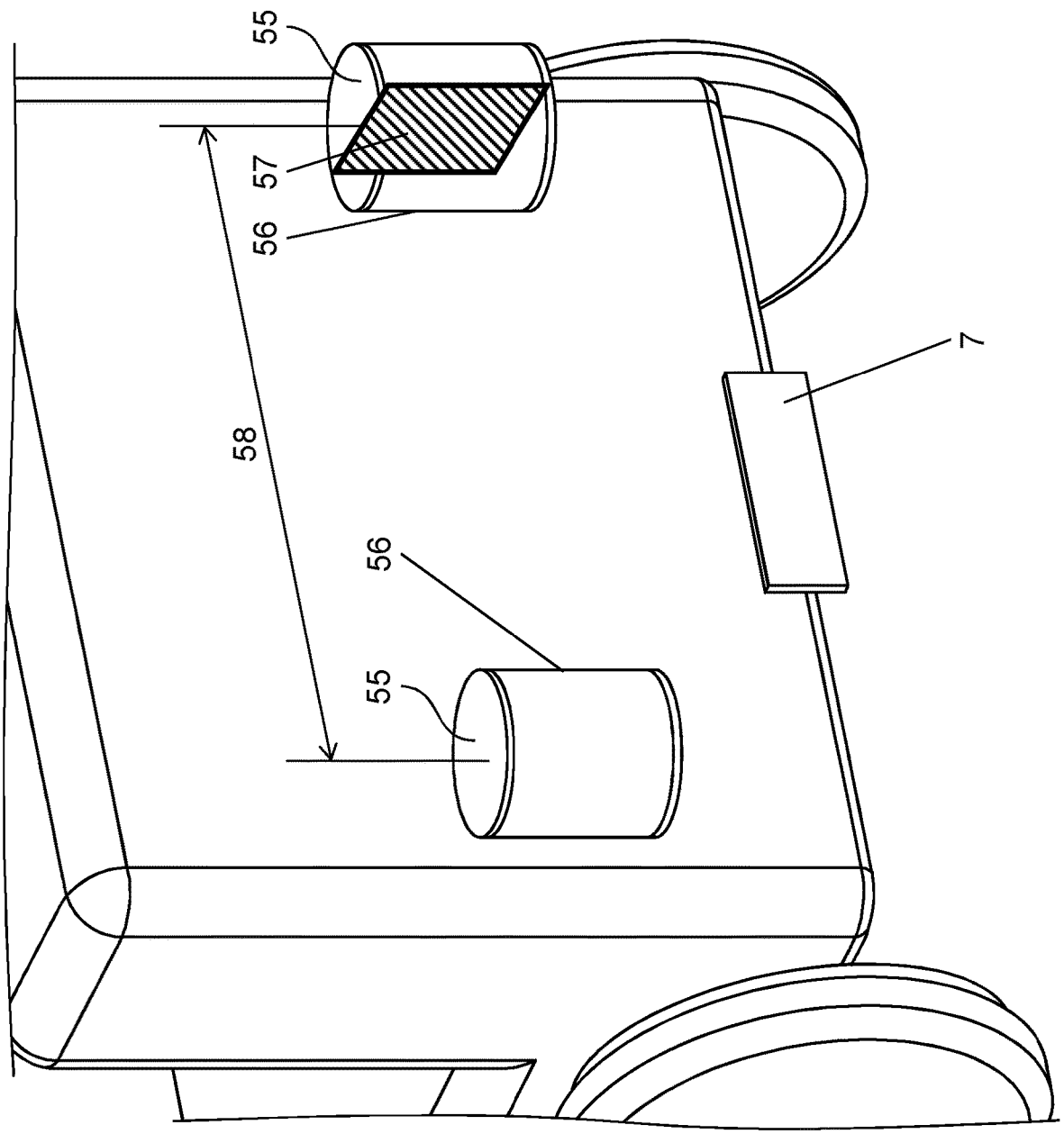
FIG. 12 is a schematic enlarged view in the vicinity of the first reflection parts according to Embodiment 2.

FIG. 12 is a schematic enlarged view in the vicinity of the first reflection parts 55 according to Embodiment 2.

When the mobile robot recognition device 300 is provided with the imaging device 34, the storage unit 31 further stores third cross-sectional shapes 57 and a third stored distance 58 of the two first reflection parts 55 in the storage step S1.

The third cross-sectional shape 57 is the minimum cross-sectional shape in cross-sectional shapes of two first reflection surfaces 56 obtained when seen from the direction perpendicular to the reference axis. For example, when the cross-sectional shape of the first reflection part 55 obtained when being cut in the direction perpendicular to the reference axis is an elliptical shape, a cross-sectional shape seen from an apex side of a long side of the elliptical shape will be the third cross-sectional shape 57.

The third stored distance 58 is a two-dimensional distance between the two first reflection parts 55 when the two first reflection parts 55 are seen from the direction perpendicular to the reference axes. Positions of reference points on the two first reflection parts 55 for calculating the third stored distance 58 do not particularly matter. In Embodiment 2, a distance between the reference axes of the two first reflection parts 55 is stored as the third stored distance 58. The imaging device 34 searches for a structure having the distance of the stored third stored distance 58 and corresponding to the shape of the stored third cross-sectional shape 57 in the measurement step S2.

As the minimum cross-sectional shape in cross-sectional shapes of two first reflection surfaces 56 obtained when seen from the direction perpendicular to the reference axis is stored as the third cross-sectional shape 57, the cross-sectional shape corresponding to the third cross-sectional shape 57 exists inside the imaged first refection surface 56 even when the orientation of the mobile robot 500 changes.

There is a case where the distance between the cross-sectional shapes corresponding to the two third cross-sectional shapes 57 differs when the orientation of the mobile robot 500 changes. In order to prepare for such situation, a structure with a distance equal to or less than the third stored distance and with cross-sectional shapes approximately the same as the third cross-sectional shapes 57 can be searched.

After that, the calculation unit 32 determines an area where the structure having the distance of the stored third stored distance 58 and corresponding to the shape including the third cross-sectional shape 57 exists as an area where a measurement target exists in the measurement step S2. Then, the range scanner 33 measures reflected waves in the area where the measurement target exists.

When the mobile robot recognition device 300 having the imaging device 34 is used as described above, the area where the mobile robot 500 exists can be specified with higher accuracy and misrecognition of the mobile robot recognition device 300 can be reduced.

In order to recognize the position and the orientation of the mobile robot 500 with higher accuracy, the mobile robot 500 may be provided with the second reflection part 7.

Operation and Effect of Embodiment 2

Operation and effect of the mobile robot having the above structure will be explained below.

According to the present disclosure, the mobile robot includes at least two first reflection parts having the first reflection surfaces reflecting electromagnetic waves, and the first reflection parts are figures in which cross-sectional shapes obtained by being cut in the direction perpendicular to the reference axis is symmetrical and continued with respect to points passing through the reference axis. The first reflection parts have the first reflection surfaces on the side surfaces. The reflection surface angle made by points passing through the rotation axis and both ends of the first reflection surface is 90 degrees or more and 360 degrees or less when the first reflection part is seen along the reference axis. Accordingly, electromagnetic waves can be reflected, and the position and the orientation can be recognized by the mobile robot recognition device.

Also in the first reflection parts 55, cross-sectional shapes obtained by being cut in the direction perpendicular to the reference axis have a similar shape. Accordingly, misrecognition by the mobile robot recognition device can be reduced.

The reference axis is parallel to the normal line direction of the travel surface of the mobile robot. Accordingly, the mobile robot can be easily recognized by the mobile robot recognition device even when the orientation of the mobile robot changes.

Also in the two first reflection parts, respective reference axes are parallel to each other. Accordingly, the same sensors mounted on the mobile robot recognition device can recognize the two first reference parts. Therefore, the mobile robot recognition device can recognize the mobile robot more easily.

When the first reflection parts 55 is seen from the reference axis direction, the reflection surface angle is 180 degrees or more and 360 degrees or less. Accordingly, the range in which electromagnetic waves can be reflected is increased in the mobile robot. Therefore, even when one sensor is mounted on the mobile robot recognition device, the mobile robot can be easily recognized.

When the two reflection parts are seen from the rotation axis direction as well as the same direction, respective reflection surface angles are 180 degrees or more when overlapping with each other. That is, both two first reflection surfaces face the same direction. Accordingly, it is possible to avoid the situation where the mobile robot recognition device is not capable of recognizing the two first reflection parts at the same time and the device can recognize the mobile robot more easily.

The two first reflection parts have first reflection surfaces on the entire surfaces of at least one-side surfaces of respective side surfaces divided by the reference surface when the surface passing through the reference axes of the two first reflection parts is the reference surface. Accordingly, it is possible to avoid the situation where the mobile robot recognition device is not capable of recognizing the two first reflection parts at the same time and the device can recognize the mobile robot more easily.

The mobile robot further includes the second reflection part having a cubic shape or a rectangular parallelepiped shape, and the second reflection part has the second reflection surface on one surface with the largest area in surfaces. The second reflection surface is parallel to the reference surface. Accordingly, the reflection part recognized by the mobile robot recognition device is increased and the mobile robot can be recognized more easily.

The second reflection surface is arranged in the same direction as the first reflection surfaces. Accordingly, it is possible to avoid the situation where the mobile robot recognition device is not capable of recognizing the two first reflection parts and the second reflection surface at the same time and the device can recognize the mobile robot more easily.

The second reflection part is arranged so that a long side of the second reflection surface is perpendicular to the reference axes of the first reflection parts. Accordingly, change in the cross-sectional shape of the second reflection part is increased when the orientation of the mobile robot changes, which allows the mobile robot recognition device to recognize the mobile robot more easily.

The second reflection surface is arranged so as to be perpendicular to the travel surface of the mobile robot. The first reflection parts and the second reflection part are fixed by three axes with respect to the mobile robot, therefore, the mobile robot recognition device can recognize the mobile robot more easily.

The two first reference parts have the rotating body shape with reference axes as rotation axes. Accordingly, the mobile robot can be easily recognized by the mobile robot recognition device even when the orientation of the mobile robot changes.

When the two first reflection parts are seen from the rotation axis direction, diameters of circles differ. Accordingly, cross-sectional shapes do not completely overlap with each other when the two first reflection parts are seen from different directions. Accordingly, the mobile robot recognition device can recognize the mobile robot more easily.

Moreover, when the two first reflection parts are seen from the direction perpendicular to the rotation axes, heights differ. Accordingly, cross-sectional shapes do not completely overlap with each other when the two first reflection parts are seen from different directions. Accordingly, the mobile robot recognition device can recognize the mobile robot more easily.

The first reflection part with a larger diameter of the circle when seen from the reference axis direction in the two first reflection parts is lower in height as compared with the other first reflection part when seen from the direction perpendicular to the reference axis. Accordingly, cross-sectional shapes do not completely overlap with each other when the two first reflection parts are seen from different directions and any of portions in a vertical width or a horizontal width protrudes in both two first reflection parts. Accordingly, the mobile robot recognition device can recognize the mobile robot.

As the mobile robot 500 according to Embodiment 1, a form of a wheelchair shape in which the pair of drive wheels 2, the pair of driven wheels 3 and the travel drive unit 4 constitute the travel drive device is assumed. However, the range in which the present disclosure can be applied is not limited to the above, and the present disclosure can be applied to overall mobile robots such as an autonomous mobile robot and a conveyance robot.

The mobile robot according to the present disclosure can recognize the position and the orientation, which can be used for the mobile robot such as a wheelchair.

What is claimed is:
1. A mobile robot comprising:
at least two first reflection parts, each of the at least two first reflection parts having a first reflection surface on a side surface thereof, the first reflection surface being configured to reflect electromagnetic waves; and a second reflection part having a second reflection surface configured to reflect electromagnetic waves, wherein, for each of the at least two first reflection parts:

a cross-sectional shape obtained by being cut in a first direction perpendicular to a reference axis is symmetrical and continuous with respect to points passing through the reference axis, the first direction being parallel to a top surface of the first reflection part or a bottom surface of the first reflection part; and a reflection surface angle defined by the points passing through the reference axis and both ends of the first reflection surface is 90 degrees or more to 360 degrees or less when the first reflection part is viewed along the reference axis, wherein:

the second reflection part has a cubic shape or a rectangular parallelepiped shape, the second reflection surface being on a surface of the second reflection part which has a largest surface area; and the second reflection surface is parallel to a surface passing through the respective reference axes of the at least two first reflection parts.

2. The mobile robot according to claim 1, wherein the respective cross-sectional shapes of the at least two first reflection parts correspond to each other.

3. The mobile robot according to claim 2, wherein, for each of the at least two first reflection parts, the reference axis is parallel to a normal line direction of a travel surface of the mobile robot.

4. The mobile robot according to claim 3, wherein the respective reference axes of the at least two first reflection parts are parallel to each other.

5. The mobile robot according to claim 4, wherein, for each of the at least two first reflection parts, the reflection surface angle is 180 degrees or more and 360 degrees or less.

6. The mobile robot according to claim 5, wherein the respective reflection surface angles of the at least two first reflection parts overlap by 180 degrees or more when viewed from a reference axis direction as well as the same direction.

7. The mobile robot according to claim 6, wherein:

a surface passing through the respective reference axes of the at least two first reflection parts is a reference surface;

for each of the at least two first reflection parts, the first reflection surface is on an entirety of the side surface thereof; and the respective side surfaces of the at least two first reflection parts are divided by the reference surface.

8. The mobile robot according to claim 1, wherein the second reflection surface is arranged in the same direction as the respective first reflection surfaces of the at least two first reflection parts.

9. The mobile robot according to claim 8, wherein a longitudinal side of the second reflection surface is perpendicular to the respective reference axes of the at least two first reflection parts.

10. The mobile robot according to claim 9, wherein the second reflection surface is perpendicular to a travel surface of the mobile robot.

11. The mobile robot according to claim 1, wherein each of the respective cross-sectional shapes of the at least two first reflection parts is circular.

12. The mobile robot according to claim 1, wherein each of the respective cross-sectional shapes of the at least two first reflection parts is elliptical.

13. A mobile robot comprising:

at least two first reflection parts, each of the at least two first reflection parts having a first reflection surface on a side surface thereof, the first reflection surface being configured to reflect electromagnetic waves, wherein, for each of the at least two first reflection parts:

a cross-sectional shape obtained by being cut in a first direction perpendicular to a reference axis is symmetrical and continuous with respect to points passing through the reference axis, the first direction being parallel to a top surface of the first reflection part or a bottom surface of the first reflection part;

a reflection surface angle defined by the points passing through the reference axis and both ends of the first reflection surface is 90 degrees or more to 360 degrees or less when the first reflection part is viewed along the reference axis; and the first reflection part is configured to rotate such that the reference axis is a rotation axis.

14. The mobile robot according to claim 13, wherein the at least two first reflection parts differ in diameters of circles when viewed from a rotation axis direction.

15. The mobile robot according to claim 14, wherein the first reflection part with a larger diameter is lower in height than the first reflection part with a smaller diameter when viewed from a direction perpendicular to the respective rotation axes of the at least two first reflection parts.

16. The mobile robot according to claim 13, wherein the at least two first reflection parts differ in heights when viewed from a direction perpendicular to the respective rotation axes of the at least two first reflection parts.

17. A mobile robot comprising:

at least two first reflection parts, each of the at least two first reflection parts having a first reflection surface on a side surface thereof, the first reflection surface being configured to reflect electromagnetic waves, wherein, for each of the at least two first reflection parts:

a cross-sectional shape obtained by being cut in a first direction perpendicular to a reference axis is symmetrical and continuous with respect to points passing through the reference axis, the first direction being parallel to a top surface of the first reflection part or a bottom surface of the first reflection part;

a reflection surface angle defined by the points passing through the reference axis and both ends of the first reflection surface is 90 degrees or more to 360 degrees or less when the first reflection part is viewed along the reference axis; and the cross-sectional shape is polygonal.

* * * * *